(12) United States Patent
Lee

(10) Patent No.: US 7,672,200 B2
(45) Date of Patent: Mar. 2, 2010

(54) METHOD OF INTER-LAYER SEARCH IN A DISK DRIVE

(75) Inventor: Jong-jin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 873 days.

(21) Appl. No.: 10/939,331

(22) Filed: Sep. 14, 2004

(65) Prior Publication Data

US 2005/0201224 A1  Sep. 15, 2005

(30) Foreign Application Priority Data

Mar. 11, 2004   (KR) .................... 10-2004-0016417

(51) Int. Cl.
G11B 7/00 (2006.01)

(52) U.S. Cl. ................ 369/44.28; 369/44.27; 369/30.1; 369/94

(58) Field of Classification Search .............. 369/44.27, 369/44.29, 44.28, 30.1–30.17, 94
See application file for complete search history.

(56) References Cited

U.S. PATENT DOCUMENTS

| | | | | |
|---|---|---|---|---|
| 5,696,743 A | * | 12/1997 | Kawasaki ................ 369/30.13 |
| 5,781,516 A | * | 7/1998 | Yamada ................... 369/30.13 |
| 5,920,527 A | * | 7/1999 | Aoki ........................ 369/30.15 |
| 5,978,328 A | * | 11/1999 | Tanaka ..................... 369/44.27 |
| 6,101,156 A | * | 8/2000 | Tanaka et al. ............ 369/44.28 |
| 6,108,291 A | * | 8/2000 | Ono et al. ................ 369/47.11 |
| 6,298,020 B1 | * | 10/2001 | Kumagami ............... 369/44.27 |
| 6,330,212 B1 | * | 12/2001 | Iida .......................... 369/30.16 |
| 6,370,093 B1 | | 4/2002 | Tada et al. |
| 7,173,886 B2 | * | 2/2007 | Sun ......................... 369/30.12 |
| 2004/0076084 A1 | * | 4/2004 | Yonezawa ................. 369/30.1 |
| 2006/0002253 A1 | * | 1/2006 | Ishihara ................... 369/44.32 |

FOREIGN PATENT DOCUMENTS

| | | |
|---|---|---|
| CN | 1232470 A | 10/1990 |
| CN | 1264896 A | 8/2000 |
| JP | 09-282675 | 10/1997 |
| JP | 2002-190120 | 7/2002 |
| KR | 1020000055646 | 9/2000 |
| KR | 10-290958 | 3/2001 |
| KR | 2003-96123 | 12/2003 |

OTHER PUBLICATIONS

Korean Patent Office Action mailed on Nov. 11, 2005.

* cited by examiner

*Primary Examiner*—Wayne R Young
*Assistant Examiner*—Linh T Nguyen (57) ABSTRACT

A method of inter-layer search of a multi-layer disk, the method including determining whether a search is required of a layer other than a currently accessed layer; searching the currently accessed layer for a position corresponding to a target address on the layer not currently accessed; and moving access to the layer not currently accessed according to the position corresponding to the target address.

20 Claims, 4 Drawing Sheets

METHOD OF INTER-LAYER SEARCH IN A DISK DRIVE

CROSS-REFERENCE TO RELATED APPLICATIONS

This application claims the priority of Korean Patent Application No. 2004-16417, filed on Mar. 11, 2004, in the Korean Intellectual Property Office, the disclosure of which is incorporated herein in its entirety by reference.

BACKGROUND OF THE INVENTION

1. Field of the Invention

The present invention relates to a method of inter-layer search in a disk drive, which drives a multi-layer disk having a plurality of recording layers, and, more particularly, to a method of inter-layer search adaptable to a multi-layer random access memory (RAM) disk.

2. Description of the Related Art

As is well known, optical disks, such as compact disks (CDs) and digital versatile disks (DVDs), which have larger storage capacity than CDs, are used as storage media.

These optical disks are largely classified into two types, these two types being read-only optical disks and writable optical disks. The former includes CDs for read only memory (CD-ROMs) and DVDs for read only memory (DVD-ROMs), and the latter is also divided into a write once read many (WORM) type, in which data can be written only once but can be read any number of times, and a random access memory (RAM) type. The WORM type includes recordable CDs (CD-Rs) and recordable DVDs (DVD-Rs), and the RAM type includes rewritable CDs (CD-RWs) and DVD-RAMs.

In the meantime, a multi-layer disk having a plurality of recording layers formed on one side thereof is used to increase storage capacity. While a DVD-RAM with a single-sided/single layer structure has a storage capacity of 4.7 Gbyte, a DVD-RAM with a single-sided/double layer structure has a storage capacity of 9.4 Gbyte.

Figure 1:
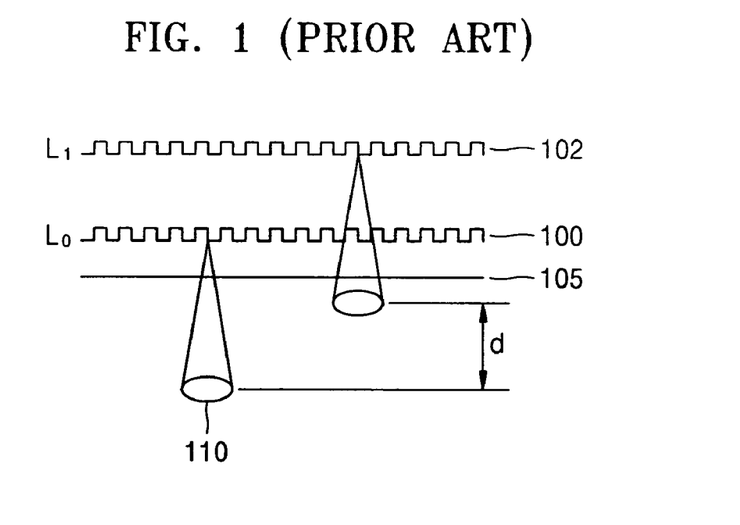
FIG. 1 is a diagram of a conventional multi-layer disk.

FIG. 1 is a schematic diagram of a multi-layer disk. Referring to FIG. 1, a multi-layer disk comprises of a bottom layer 100 and a top layer 102. Information recorded in the respective layers 100 and 102 is reproduced using a laser beam emitted from a laser diode (not shown). To read accurately the information recorded in the bottom layer 100 and the top layer 102, the laser beam must be focused exactly on the respective layers 100 and 102. The focus of the laser beam is adjusted by moving an objective lens 110 vertically, that is, in an optical axial direction relative to the multi-layer disk.

When reproducing information from a multi-layer disk as shown in FIG. 1, since data is scattered to be recorded in layers, there must be an ability to reproduce information recorded in one of the layers and then reproduce information recorded in the other layer subsequently. In that case, a focal point of a laser beam is shifted from one layer to the other layer by moving the objective lens 110 in the optical axial direction. This procedure is referred to as a layer jump.

Figure 2A:
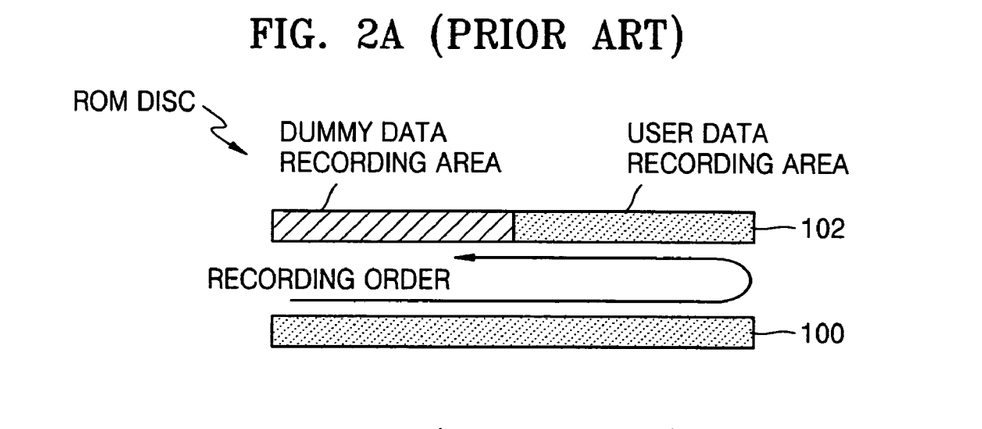
FIGS. 2A and 2B are diagrams illustrating the configuration of recorded data on the conventional multi-layer disk shown in FIG. 1.
Figure 2B:
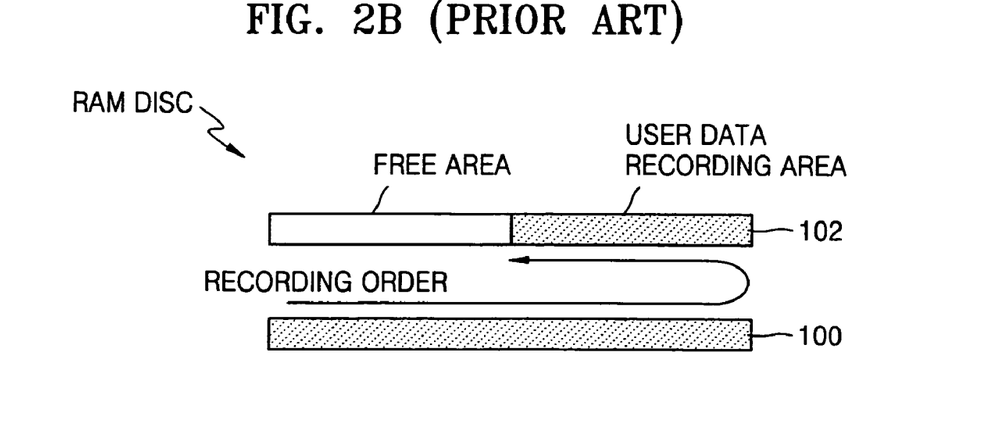

FIGS. 2A and 2B are diagrams illustrating the configuration of recorded data in the multi-layer disk shown in FIG. 1. In detail, FIG. 2A illustrates the recorded data in a multi-layer ROM disk and FIG. 2B illustrates the recorded data in a multi-layer RAM disk.

Referring to FIGS. 2A and 2B, a dotted area represents an area where user data is recorded, a hatched area represents an area where dummy data is recorded, and a blank area represents an area where neither user data nor dummy data is recorded.

In the case of the multi-layer ROM disk, as shown in FIG. 2A, dummy data is recorded in an area where user data is not recorded, as additional recording cannot be done. Meanwhile, in the case of multi-layer RAM disk, as shown in FIG. 2B, an area where user data is not recorded is left intact in preparation for additional recording, and therefore no dummy data is recorded in that area.

Figure 3:
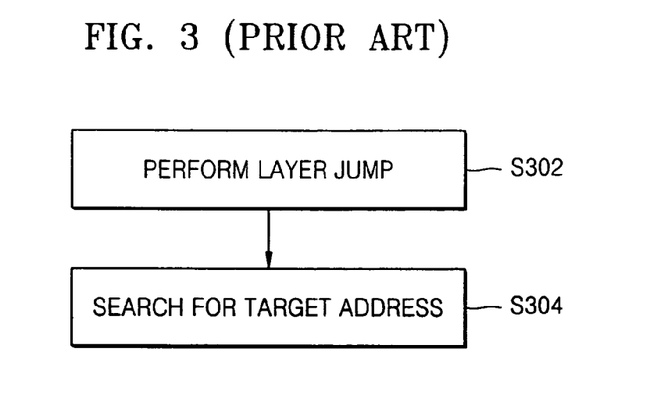
FIG. 3 is a flow chart of a conventional method of inter-layer search.

FIG. 3 is a flow chart illustrating a conventional method of inter-layer search in a multi-layer disk drive.

Referring to FIG. 3, in operation S302, a layer jump is first performed if it is necessary to search the other layer of the multi-layer disk. The layer jump is performed by applying a focus jump pulse to a focus actuator in order to move an objective lens toward a target layer and then focusing a laser beam on the target layer using a focus error signal.

Next, in operation S304, after the focus is adjusted on the target layer, a target address is searched for.

The conventional method of inter-layer search as shown in FIG. 3 is effective for multi-layer ROM disks. There is a problem, however, when the conventional method is applied to multi-layer RAM disks, because a search time could be too long due to the area where user data is not recorded.

More particularly, most disk drives read an address using identification (ID) information of a header, especially during a reproduction operation, in order to reduce an access time. However, a RAM disk may include an area where user data, which includes the header, is not recorded. In the case in which a pickup unit is positioned due to a layer jump into the area where user data is not recorded, it is impossible to read the address using ID information of a header.

Accordingly, the address is read using a wobble signal instead of ID information in the header. In this case, however, since it requires a certain amount of time in order to convert a spindle servo operation, control gains, set a rotational speed of a spindle motor, and so on, the access time will be increased as a whole.

As the access time increases, product competitiveness may decrease. Accordingly, there is a demand for a method of inter-layer search in a disk drive to drive a multi-layer RAM disk, which can reduce an access time.

SUMMARY OF THE INVENTION

The present invention provides a method of inter-layer search in a disk drive to drive a multi-layer disk, which reduces an access time and ensures a stable servo operation.

Additional aspects and/or advantages of the invention will be set forth in part in the description which follows and, in part, will be obvious from the description, or may be learned by practice of the invention.

According to an aspect of the present invention, there is provided a method of inter-layer search in a disk drive to drive a multi-layer disk, the method comprising: determining whether the search requires a focus jump from a superior layer with a superior priority in recording to an inferior layer with an inferior priority in recording compared to the superior layer; searching the superior layer for a position corresponding to a target address on the inferior layer in response to the search requiring moving the focal point from the superior layer to the inferior layer; performing the focus jump to the inferior layer after searching the superior layer for the corresponding position.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

First, the reason why an access time is increased when a pickup unit is positioned on an area where user data is not recorded in a random access memory (RAM) disk will be explained in detail.

As is well known, a RAM disk has wobbled tracks. The wobble refers to a waved shape induced to separate a land track and a groove track. The shape of the wobble is repeated periodically. A wobble signal based on the wobble is used to obtain information regarding a rotational speed of the disk and synchronization. In particular, the RAM disk uses an address-in pre groove (ADIP) method in which address information is recorded by modulating the amplitude, frequency, or phase of the wobble.

That is, the ADIP method records the address information by alternating the frequency, phase, or amplitude of the wobble. For example, in the case of phase modulation, supposing that a phase of 0 degrees corresponds to a binary number "0", and a phase of 180 degrees corresponds to a binary number "1", digital information can be represented by combining wobbles with different phases.

In a multi-layer disk, user data is first recorded in a bottom layer (referred to as a superior layer), which is closer to a substrate of the multi-layer disk, and then is recorded in a top layer (referred to as an inferior layer), which is closer to a surface of the multi-layer disk. Further, to achieve an easier access, the data is recorded in a direction from an inner circumference to an outer circumference in the bottom layer and, conversely, is recorded in a direction from the outer circumference to the inner circumference in the top layer so that the user data can be recorded and/or reproduced with a minimum movement of the pickup unit. The user data is recorded in units known as sectors, and address information is included in identification (ID) information of a sector header.

In general, a disk drive, whether it is a RAM disk or a read-only memory (ROM) disk, uses a method of extracting an address from the ID included in the sector header.

This is because a constant angular velocity (CAV) method is more advantageous in performance than a constant linear velocity (CLV) method.

That is, to obtain a wobble signal with a constant frequency, a CLV control is needed. However, to accomplish this, a rotational speed of a spindle motor continues to be adjusted around a reference velocity, resulting in poor performance.

However, if the address information is extracted from the ID of a sector header, a CAV can be used, thereby achieving more improved performance compared with the method using a wobble signal.

Further, since a ROM disk does not have a wobble, address information is extracted using the ID of a sector header during a reproduction operation of a disk drive that supports both ROM and RAM disks.

When the address information is extracted using the ID of the sector header, as explained with reference to FIG. 3, if a pickup is positioned due to a layer jump on an area where user data is not recorded in a RAM disk, a servo system of a CLV control should be converted in order to extract the address information using a wobble signal since the sector header is not recorded in the area where user data is not recorded. Consequently, an access time is increased.

Since a radio frequency (RF) signal is weak in the area where user data is not recorded, the RF signal can be used to determine whether user data is not recorded in an area. If it is determined to be an area where user data is not recorded, a servo operation is converted to extract the address information using the wobble signal.

In this case, since an additional time is taken to set a spindle control carried out in the CLV method in order to generate a wobble signal with a constant frequency, and set gains, frequency characteristics, etc., of circuit blocks for extracting the address information from the wobble signal, the access time is increased.

Figure 4:
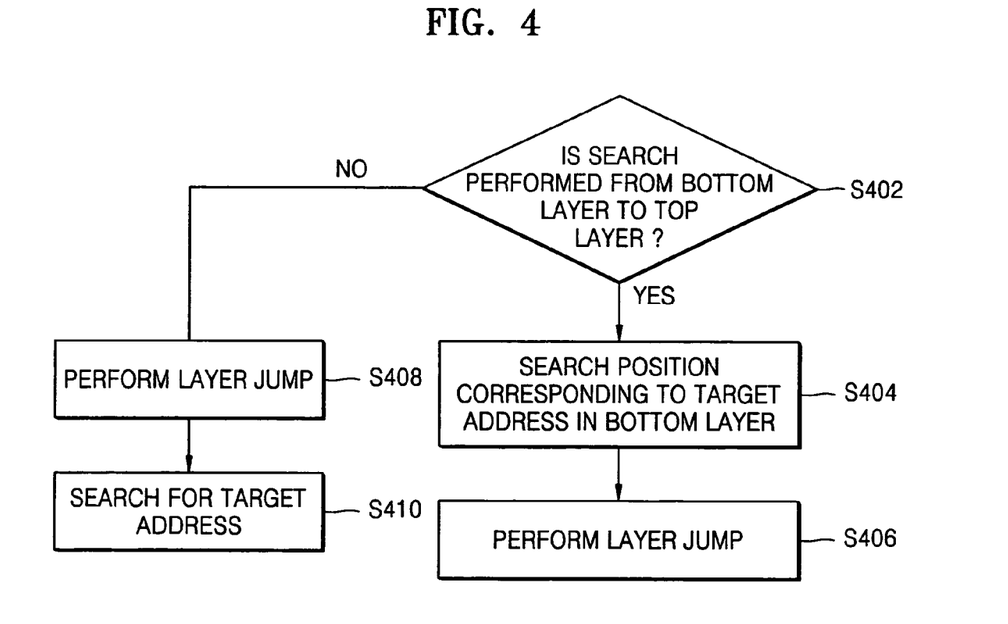
FIG. 4 is a flow chart of a method of inter-layer search according to an embodiment of the present invention.

FIG. 4 is a flow chart of a method of inter-layer search according to an embodiment of the present invention.

First, in operation S402, if inter-layer search is required, it is determined whether the inter-layer search is from a bottom layer to a top layer.

If the inter-layer search is from a bottom layer to a top layer, the process goes to operation S404. In operation S404, a position corresponding to a target address is searched for in the bottom layer.

In operation S406, a layer jump is performed after the position corresponding to the target address is searched for.

Here, if it is assumed that an address includes a layer address and an address in a layer, addresses of the two layers with respect to a position on the multi-layer disk are different only in layer addresses. Accordingly, a target address can be accessed by searching a position corresponding to the target address, that is, a position having an address in a current layer equal to that of the target address, and then performing a layer jump.

In a multi-layer disk, after a bottom layer is completely recorded, a top layer is recorded. Further, efficient search of an area where user data is not recorded cannot occur during a reproduction operation. Accordingly, it is always possible that a position corresponding to a target address is first searched for in the bottom layer, and then a layer jump is performed.

When the search is performed from the bottom layer to the top layer, user data is already recorded in the bottom layer. Accordingly, address information can be obtained using the ID of a sector header while the position corresponding to the target address is searched for in the bottom layer. Since the address information does not need to be obtained using a wobble signal, the position corresponding to the target address is first searched for in the bottom layer and then the layer jump is performed, thereby preventing the access time from increasing.

On the other hand, if it is judged in operation S402 that the search is from the top layer to the bottom layer, in operation S408, a layer jump is performed as in a conventional method, and in operation S410, the target address is searched for in the layer to which the layer jump is made.

When the search is from the top layer to the bottom layer, since user data is already recorded in the bottom layer, the access time is not increased even though the target address is searched for after the layer jump is performed in the same manner as in the conventional method.

Figure 5:
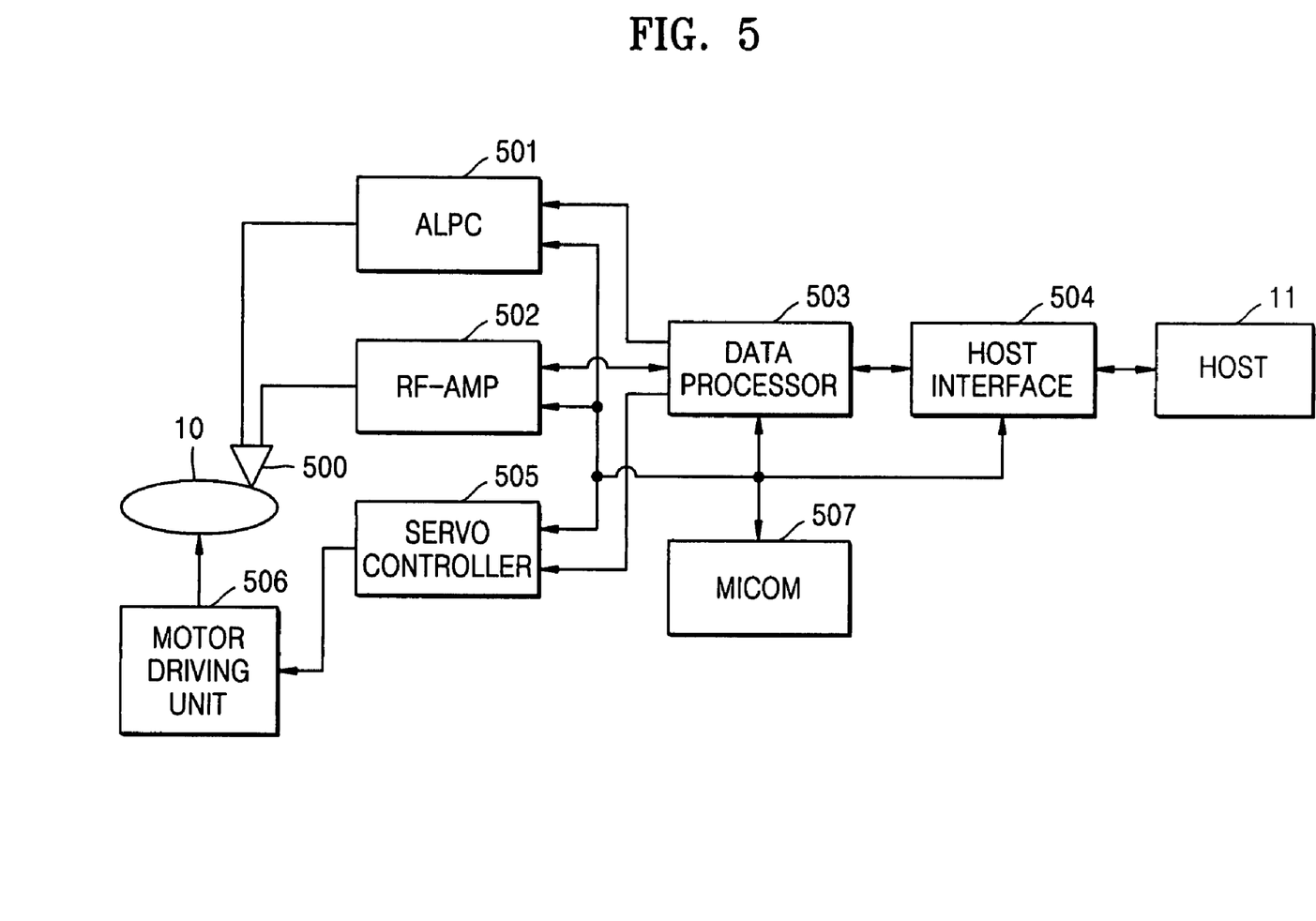
FIG. 5 is a schematic block diagram of a disk drive performing a method of inter-layer search according to an embodiment of the present invention.

FIG. 5 is a schematic block diagram illustrating a configuration of a disk drive performing a method of inter-layer search according to an embodiment of the present invention.

A disk drive shown in FIG. 5 includes a pickup unit 500, an adaptive laser power controller (ALPC) 501, a radio frequency-amplifier (RF-AMP) 502, a data processor 503, a host interface 504, a servo controller 505, and a motor driving unit 506.

The pickup unit 500 records or reads a signal on or from a multi-layer optical disk 10. Here, the multi-layer optical disk 10 is a RAM disk or a ROM disk.

The ALPC 501 detects an output of a laser diode included in the pickup unit 500, and controls the output of the laser diode adaptively according to output variations. Further, the ALPC 501 controls the output of the laser diode according to operation modes, such as record, reproduction, erase, and others.

The RF-AMP 502 amplifies an electrical signal output from the pickup unit 500. The RF-AMP 503 detects a reproduction signal from the amplified electrical signal and provides the detected reproduction signal to the data processor 503, and also detects a focus error signal, a tracking error signal, and a wobble signal and provides the detected signals to the servo controller 505.

During a reproduction operation, the data processor 503 detects a synchronization signal from the reproduction signal provided from the RF-AMP 502, demodulates the detected synchronization signal, and detects and corrects errors. Further, the data processor 503 generates various control signals for the RF-AMP 502, and provides a servo-related signal to the servo controller 505.

During a record operation, the data processor 503 modulates data provided from a host 11 through the host interface 504, corrects errors, encodes the data, generates a corresponding pulse signal, and provides the pulse signal to the ALPC 501.

The host interface 504 interfaces between the host 11 and the data processor 503 of the optical recording/reproducing apparatus.

The servo controller 505 receives the servo-related signals provided from the data processor 503, and controls servos, such as a rotational speed of a motor, tracking, focus, etc.

The pickup unit 500 includes a focus actuator and a tracking actuator, which are respectively controlled by a focus control signal and a tracking control signal provided from the servo controller 505.

The motor driving unit 506 includes a spindle motor (not shown) that rotates the multi-layer optical disk 10, and a drive (not shown). The motor driving unit 506 controls the spindle motor and the drive according to a motor driving signal provided from the servo controller 505.

The apparatus shown in FIG. 5 may further include a micom 507 that controls the aforesaid blocks and signals flowing through the blocks generally.

The data processor 503 controls a search operation, particularly, an operation of inter-layer search according to the present invention.

During the search operation, the data processor 503 first determines whether the search is from a bottom layer to a top layer if inter-layer searching is required.

If it is determined that the search is from a bottom layer to a top layer, a position corresponding to a target position in the top layer is first searched for in the bottom layer. While the pickup unit 500 is moved on the multi-layer optical disk 10, the data processor extracts the ID of a sector header from the reproduction signal, that is, the RF signal, provided from the RF-AMP 502, and obtains address information indicating the position of the pickup unit 500. The data processor 503 can determine with reference to the obtained address information whether the pickup unit 500 has reached the position corresponding to the target address.

If the position corresponding to the target address is found in the bottom layer, the data processor 503 controls the servo controller 505 to perform a layer jump.

The servo controller 505 generates a focus jump pulse and provides the generated focus jump pulse to the pickup unit 500. The focus actuator of the pickup unit 500 responds to the focus jump pulse and moves the objective lens 110 so as to focus on the top layer. Thereafter, the servo controller 505 a focuses the objective lens 110 exactly on the top layer with reference to a focus error signal provided from the RF-AMP 502.

Figure 6A:
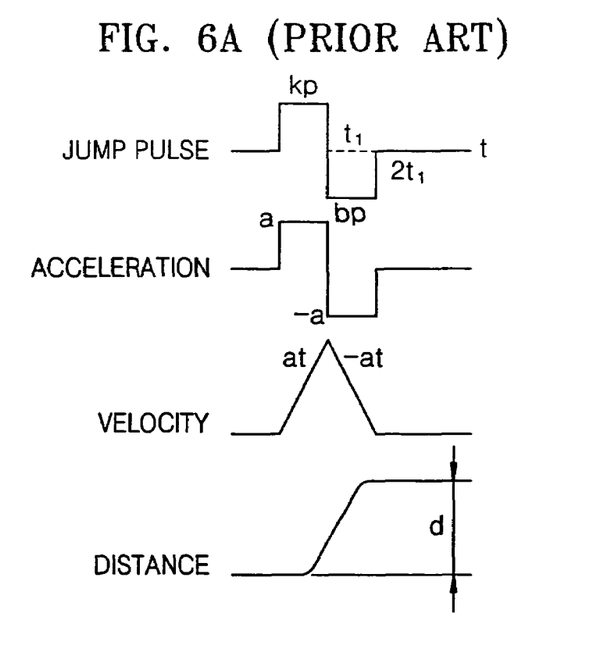
FIGS. 6A and 6B illustrate waveforms of focus jump pulses applied to a focus actuator during layer jumps.
Figure 6B:
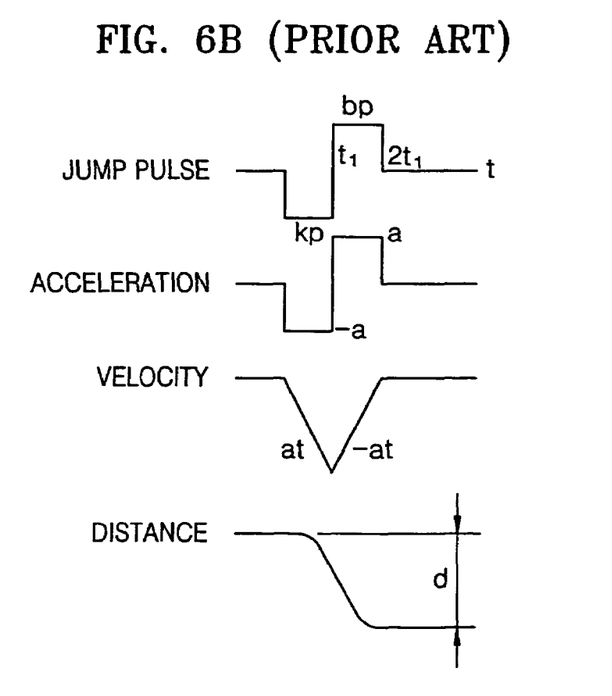

FIGS. 6A and 6B are waveforms of focus jump pulses applied to the focus actuator during layer jumps. FIG. 6A illustrates a case of a focus jump in a normal direction from the bottom layer 100 to the top layer 102, and FIG. 6B illustrates a case of a focus jump in an opposite direction to the direction illustrated in FIG. 6A.

To perform a focus jump in a normal direction, a kick pulse kp for the start from the bottom layer 100 and a brake pulse bp for the stop at the top layer 102 should be applied sequentially to the focus actuator, as shown in FIG. 6A.

The kick pulse kp is applied in an early stage of the focus jump to the focus actuator (not shown) to accelerate the objective lens 110. If the kick pulse kp is applied to the focus actuator, the objective lens 110 is accelerated gradually, and a velocity at a point t1 becomes $\alpha t1$. Here, $\alpha$ represents an acceleration level caused due to the kick pulse, and t1 represents an acceleration time. Thereafter, if the brake pulse bp is applied to the focus actuator for the time t1, a laser focus is placed on the top layer 102. Accordingly, the focal point of the objective lens 110 is moved by a distance "d" between the bottom layer 100 and the top layer 102.

Furthermore, since the focus jump in the opposite direction illustrated in FIG. 6B is performed in the same manner as in the focus jump in the normal direction illustrated in FIG. 6, an explanation thereof will not be given.

As described above, when a layer including an area where user data is not recorded is to be searched, the method of inter-layer searching according to the present invention searches for the position corresponding to the target address in a layer where user data is recorded, and then performs the layer jump to the layer where user data is not recorded, thereby reducing an access time.

It is understood that an embodiment of the present invention may be used and/or controlled by a machine-readable medium on which is stored a set of instructions (i.e., software) embodying any one, or all, of the embodiments described herein. The machine-readable medium may include permanent or removable storage, such as magnetic and optical discs, RAM, ROM, etc., on which the process and data structures of the present invention can be stored and distributed.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of inter-layer search in a disk drive to drive a multi-layer disk, the method comprising:
   determining whether the search requires a focus jump between a superior layer with a superior priority in recording and an inferior layer with an inferior priority in recording compared to the superior layer;
   searching the superior layer for a position corresponding to a target address on the inferior layer in response to the search requiring moving the focal point from the superior layer to the inferior layer, the position corresponding to the target address on the inferior layer being a position having an address on the superior layer equal to that of the target address on the inferior layer;
   performing the focus jump to the inferior layer after searching the superior layer for the corresponding position if the search is determined to require a focus jump from the superior layer to the inferior layer; and
   performing the focus jump to the superior layer from the inferior layer and performing a searching of the superior layer for the target position, without a searching of the inferior layer for a position corresponding to the target position in the inferior layer, if the search is determined to require a focus jump from the inferior layer to the superior layer.

2. The method of claim 1, wherein the multi-layer disk is a random access memory disk.

3. The method of claim 1, wherein the searching the superior layer for a position corresponding to the target address on the inferior layer comprises extracting an address from identification information of a sector header obtained from a radio frequency signal while a pickup unit is moved on the superior layer, and determining whether the pickup unit accesses the target address by comparing the extracted address with the target address.

4. A method of inter-layer search of a multi-layer disk, the method comprising:
   determining whether a search is required of a layer other than a currently accessed layer;
   selectively performing: searching of the currently accessed layer for a position corresponding to a target address on the layer not currently accessed then moving access to the layer not currently accessed according to the position corresponding to the target address; and
   moving access to the layer not currently accessed, without the searching of the currently accessed layer, then searching for the target address on the layer not currently accessed, the position corresponding to the target address on the layer not currently accessed being a position having an address on the currently accessed layer equal to that of the target address on the layer not currently accessed,
   wherein the selective performing is based on the determination of whether the search is required of the layer other than the currently accessed layer.

5. The method of claim 4, wherein, when the currently accessed layer has a superior priority in recording, the selective performing further comprises selectively performing the searching of the currently accessed layer for the position corresponding to the target address on the layer not currently accessed then the moving access to the layer not currently accessed according to the position corresponding to the target address.

6. The method of claim 4, wherein, when the layer not currently accessed has an inferior priority in recording, the selective performing further comprises selectively performing the moving access to the layer not currently accessed, without the searching of the currently accessed layer, then the searching for the target address on the layer not currently accessed.

7. The method of claim 4, wherein, when the currently accessed layer is a bottom layer, and the layer not currently accessed is a top layer, the selective performing further comprises selectively performing the searching of the currently accessed layer for the position corresponding to the target address on the layer not currently accessed then the moving access to the layer not currently accessed according to the position corresponding to the target address.

8. The method of claim 4, wherein the moving access to the layer not currently accessed comprises a layer jump.

9. The method of claim 4, wherein the position corresponding to the target address has an address in the currently accessed layer that is equal to the target address in the layer not currently accessed.

10. A method of inter-layer search of a multi-layer disk, the method comprising:
    determining whether a search is required of a layer other than a currently accessed layer;
    searching the currently accessed layer for a position corresponding to a target address on the layer not currently accessed, the position corresponding to the target address on the layer not currently accessed being a position having an address on the currently accessed layer equal to that of the target address on the layer not currently accessed; and
    moving access to the layer not currently accessed according to the position corresponding to the target address,
    wherein a layer jump is performed before searching for the target address in response to the currently accessed layer being a top layer, and the layer not currently accessed being a bottom layer.

11. A method of inter-layer search of a multi-layer disk, the method comprising:
    selectively performing: searching a currently accessed layer of the multi-layer disk for a position corresponding to a target address on a layer of the multi-layer disk not currently accessed then moving access to the layer not currently accessed according to the position corresponding to the target address; and moving access to the layer not currently accessed, without the searching of the currently accessed layer, then searching for the target address on the layer not currently accessed, ,the position corresponding to the target address on the layer not currently accessed being a position having an address on the currently accessed layer equal to that of the target address on the layer not currently accessed,
    wherein the selective performing is based on aspects of the currently accessed layer and/or the layer not currently accessed.

12. An apparatus to perform inter-layer search of a multi-layer disk, comprising:
    a pickup unit to record/read a signal to/from the multi-layer disk; and
    a servo controller to control focusing and tracking functions of the pickup unit;
    wherein the pickup unit selectively performs: searching a currently accessed layer of the multi-layer disk for a position corresponding to a target address on a layer of the multi-layer disk not currently accessed then moving access to the layer not currently accessed according to the position corresponding to the target address; and moving access to the layer not currently accessed, without the searching of the currently accessed layer, then searching for the target address on the layer not currently accessed, the position corresponding to the target address on the layer not currently accessed being a position having an address on the currently accessed layer equal to that of the target address on the layer not currently accessed, wherein the selective performing of the pickup unit is based on aspects of the currently accessed layer and/or the layer not currently accessed.

13. The apparatus of claim 12, further comprising a data processor to control the inter-layer search.

14. The apparatus of claim 13, wherein the selective performing by the pickup unit is based upon a result of a determination by the data processor of whether the inter-layer search is from a bottom layer to a top layer.

15. The apparatus of claim 13, wherein the data processor extracts identification information of a sector header from a reproduction signal to obtain address information indicating the position of the pickup unit.

16. The apparatus of claim 15, wherein the reproduction signal is a radio frequency signal.

17. The apparatus of claim 16, further comprising a radio frequency amplifier to provide the radio frequency signal to the data processor.

18. The apparatus of claim 13, wherein the data processor controls the servo controller to perform a layer jump to access the layer not currently accessed.

19. The apparatus of claim 12, wherein the apparatus is a disk drive.

20. A machine-readable storage medium to control an apparatus to implement an inter-layer search of a multi-layer disk, the inter-layer search comprising:

selectively performing: searching a currently accessed layer of the multi-layer disk for a position corresponding to a target address on a layer of the multi-layer disk not currently accessed then moving access to the layer not currently accessed according to the position corresponding to the target address; and moving access to the layer not currently accessed, without the searching of the currently accessed layer, then searching for the target address on the layer not currently accessed, the position corresponding to the target address on the layer not currently accessed being a position having an address on the currently accessed layer equal to that of the target address on the layer not currently accessed, wherein the selective performing is based on aspects of the currently accessed layer and/or the layer not currently accessed.

* * * * *

UNITED STATES PATENT AND TRADEMARK OFFICE
CERTIFICATE OF CORRECTION

PATENT NO. : 7,672,200 B2
APPLICATION NO. : 10/939331
DATED : March 2, 2010
INVENTOR(S) : Jong-jin Lee It is certified that error appears in the above-identified patent and that said Letters Patent is hereby corrected as shown below:

Column 8, Line 49, change "accessed, ,the" to --accessed, the--.

Signed and Sealed this

Twenty-fifth Day of May, 2010

David J. Kappos
*Director of the United States Patent and Trademark Office*